United States Patent [19]

Murphy

[11] 4,398,777
[45] Aug. 16, 1983

[54] ROLLER ASSEMBLY WITH ROLLER RETENTION MECHANISM

[75] Inventor: William W. Murphy, Goshen, Conn.

[73] Assignee: The Torrington Company, Torrington, Conn.

[21] Appl. No.: 450,353

[22] Filed: Dec. 16, 1982

Related U.S. Application Data

[63] Continuation of Ser. No. 223,245, Jan. 8, 1981, abandoned.

[51] Int. Cl.³ .............................................. F16C 41/04
[52] U.S. Cl. ................................. 308/207 R; 308/1 A
[58] Field of Search .................. 308/207 R, 217, 218, 308/207 A, 202, 212; 308/1 A

[56] References Cited

U.S. PATENT DOCUMENTS

| | | | |
|---|---|---|---|
| 4,166,660 | 9/1979 | Murphy | 308/202 |
| 4,235,487 | 11/1980 | Schard | 308/217 |
| 4,239,304 | 12/1980 | Wakunami | 308/217 |

Primary Examiner—Lenard A. Footland
Attorney, Agent, or Firm—F. S. Troidl

[57] ABSTRACT

The roller retention mechanism includes at least three portions each extending into contact with two adjoining rollers. The rollers are wedged apart circumferentially. The "keystoning" effect presses all the rollers against the wall of the bore in the roller assembly with sufficient force to prevent axial movement of the rollers and to radially retain the rollers in the roller assembly. The roller retention mechanism is constructed and arranged to be subsequently pushed axially from the roller assembly.

4 Claims, 6 Drawing Figures

ROLLER ASSEMBLY WITH ROLLER RETENTION MECHANISM

This application is a continuation of application Ser. No. 223,245, filed Jan. 8, 1981, abandoned.

This invention relates to roller bearings. More particularly, this invention is a novel roller bearing with a novel roller retention mechanism.

For many years full complements of loose rollers have been shipped in bodies with cylindrical bores, such as bearing outer race rings. To keep the rollers in place in the races radially, grease or some kind of tube or cylinder inside the circle of rollers has been used. Usually the outer race includes flanges to keep the rollers axially in place during shipment. However, often it is desired to ship the complement of loose rollers in an outer race which has a bore of the same diameter throughout its length, that is, it has no end flanges. In this situation, the problem of retaining the loose rollers in the race is compounded. It is not practical to consider grease with its slight retention especially in hot climates and if a tube is used, it is necessary to employ an interference fit sufficient to assure that all rollers are forced against the outer race strongly enough so that the roller to race friction prevents axial movement of the rollers. This means that the tube outside diameter has to be larger than the maximum shaft diameter by an amount greater than the diametrical clearance that can occur in the roller and outer race assembly. This often causes problems when inserting the tube within the circle of rollers and when pushing the oversize tube out through a port or bore in the associated mechanism which may result in leaving shreds of the tube material in the bearing of the mechanism in which it is used.

In U.S. Pat. No. 4,166,660, roller retention mechanisms are described for exerting a keystoning effect on the rollers to prevent axial movement of the rollers and to retain the rollers in the roller assembly. The roller retention mechanisms specifically described in such patent are made of a metal or of a synthetic resin. The retention mechanism such as retention springs are inserted by hand during production. The retaining springs include two diametrically opposed portions each of which wedge between two adjoining rollers. Often, in production, the retaining springs inserted by hand are not exactly positioned to contact the rollers at diametrically opposed points, causing uneven loading and poor roller retention. This, of course, is undesirable.

My new roller retention mechanism for use in a roller assembly is constructed so that at least three portions of the roller retention mechanism each extend into contact with the converging arcs of two adjoining rollers when inserted into the bore of the roller assembly body. Each of the three portions push the rollers apart circumferentially to keystone all the rollers and press all of the rollers against the wall of the bore with sufficient force to prevent axial movement of the rollers and to retain the rollers in the body. The roller retention mechanism may be removed from the body after shipment, preferably by a simple axial push.

The invention, as well as its many advantages, may be further understood by reference to the following detailed description and drawings in which.

In the various figures, like parts are referred to by like numbers.

Figure 1:
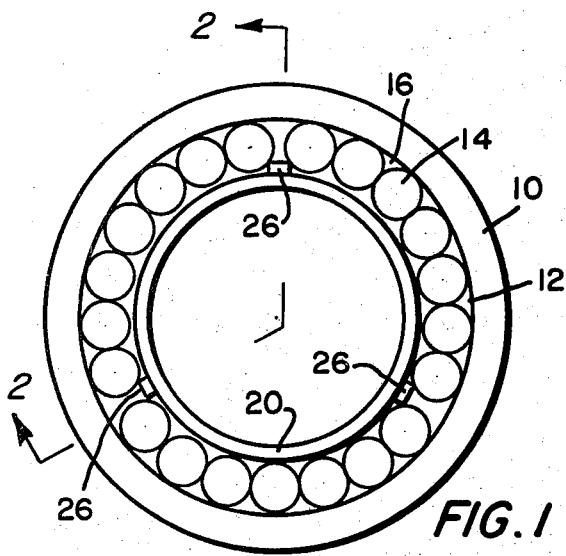
FIG. 1 is a top view of one preferred embodiment of the invention.
Figure 2:
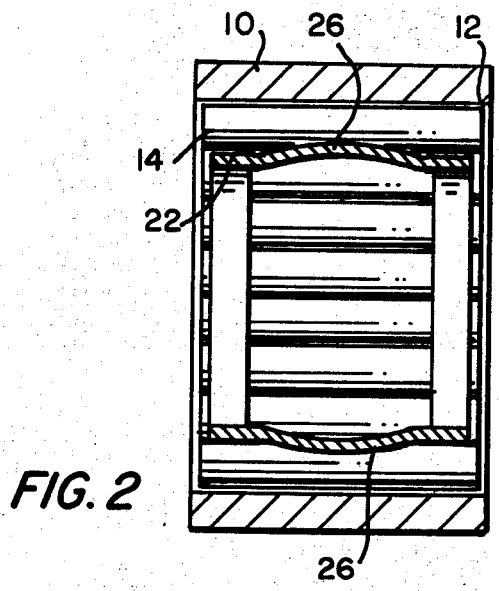
FIG. 2 is a view taken along lines 2—2 of FIG. 1 and in the direction of the arrows.

Referring to the drawings, and more particularly to FIG. 1 and FIG. 2, the roller assembly includes a casing or body 10. A bore 12 extends through the body 10. The bore 12 has the same diameter throughout its length and the body 10 has no flanges. However, if desired, one or more flanges may be provided at one or more ends of the body 10.

A plurality of rollers 14 extend lengthwise within the bore 12 and are in contact with the surface of the bore 12. The rollers 14 abut one another and form a substantially closed circle of rollers.

Figure 3:
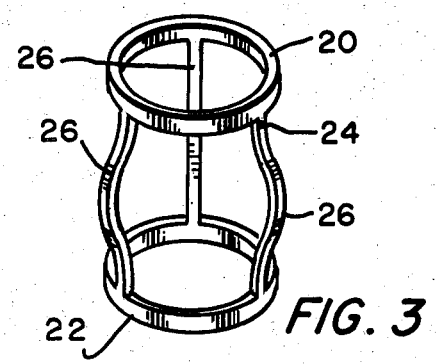
FIG. 3 is a perspective view of the roller retention mechanism included in FIG. 1 and FIG. 2.

A roller retention mechanism is shown inserted into the bore 12. The roller retention mechanism may be made from a spring or from plastic or flat stock spring material. It includes a first end rim 20 (see FIG. 3) and a second end rim 22. Three axially extending, interconnecting spring members 24 interconnect end rims 20 and 22. The spring members 24 are circumferentially spaced, and in the embodiment shown in FIGS. 1 through 3, the interconnecting spring members are circumferentially equally spaced and intended for numbers of rollers capable of being divided into three equal groups. This spacing may be altered to accommodate non equal groups of rollers.

Each interconnecting spring 24 has a central outwardly extending or bulging portion 26. When the spring is inserted into the bore 12, the bulging portions 26 of springs 24 extend into contact with the converging arcs of two adjoining roller surfaces 14. Thus, bulging portions 26 push the rollers 14 apart circumferentially, to keystone all of the rollers and press all of the rollers against the wall of the bore 12. The force is sufficient to prevent axial movement of the rollers 14 and to retain the rollers in the body 10. The spring may be easily removed from the body 10 and the circle of rollers by the axial push of an appropriate tool while the rollers themselves are restrained by other means.

Figure 4:
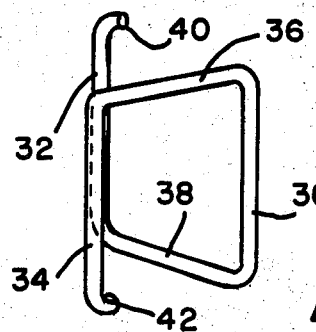
FIG. 4 is a perspective view of another preferred embodiment of a roller retention mechanism.
Figure 5:
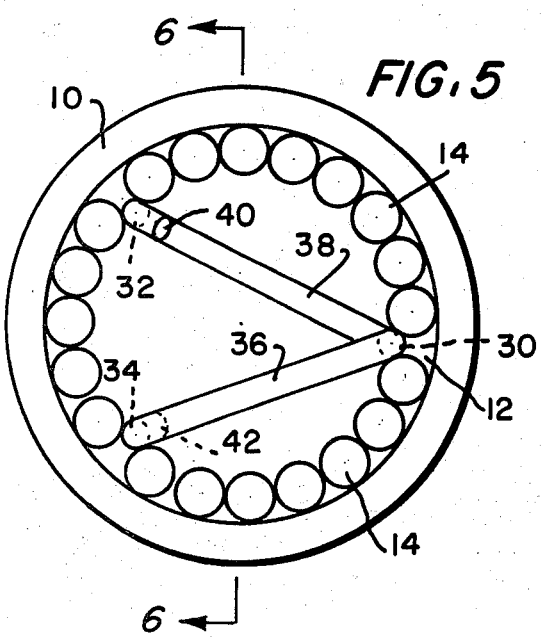
FIG. 5 is a top view of a roller assembly including the roller retention mechanism of FIG. 4.
Figure 6:
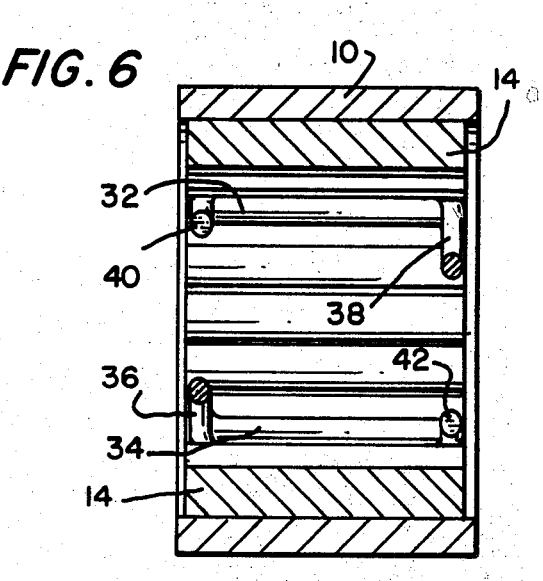
FIG. 6 is a view taken along lines 6—6 of FIG. 5 and in the direction of the arrows.

In the embodiment shown in FIGS. 4 through 6, the roller retention mechanism is formed from a wire. Referring to FIG. 4, the wire is shaped so as to have at least three circumferentially separated, axially extending portions 30, 32, and 34. The entire spring is made of one part and includes a portion 36 leading from one end of axially extending portion 34 to one of axially extending portion 30, and an interconnecting portion 38 leading from the other end of axially extending portion 30 to one end of axially extending portion 32. The free ends of axially extending portions 32 and 34 are hooked at 40 and 42, respectively, to facilitate the removal of the spring from body 10 and the circle of rollers.

As shown in FIGS. 5 and 6, when the spring of FIG. 4 is inserted in the bore 12 of body 10, the axially extending portions 30, 32, and 34 each extend into contact with the converging arcs of two adjoining rollers 14 at circumferentially separated points of the body 10. As in the embodiment of FIGS. 1 through 3, the wedging effect is such as to keystone all the rollers to prevent axial movement of the rollers and to retain the rollers in the body 10. Also, as in the case of the embodiment of FIGS. 1 through 3, the spring of the embodiment of FIGS. 4 through 6 may be easily removed axially by the axial push of an appropriate tool while the rollers are restrained.

My new retainer is extremely cheap and disposable. It is made for a single-use application and is discarded when removed from the roller assembly, although it could be re-used as desired. There is no collection for shipment back to the bearing company, no requirement of careful handling, and no concern about sharp burrs and edges raised on the springs to do damage during previous use and handling which burrs and edges might harm bearing components or the mechanism if the springs were re-used.

Each of the preferred embodiments shown include three portions each adapted to extend into a space between two adjacent rollers. However, if desired, more than three axially extending portions on the roller retention mechanism may be provided.

I claim:

1. A roller assembly comprising: a body with a cylindrical bore; a single-use disposable roller retention mechanism located inside the bore, said single-use disposable roller retention mechanism being adapted to be removed before the rest of the roller assembly is placed in operation, a plurality of rollers extending lengthwise inside the bore, said rollers extending around the entire circumference of the bore with all the rollers in contact with the wall of the bore, said roller retention mechanism having at least three circumferentially spaced portions, each extending radially between two adjoining rollers to contact said two adjoining rollers in a manner to push these two adjoining rollers apart circumferentially to keystone all the rollers so that all the rollers in the circumferential space between the circumferentially spaced portions are in contact, all the rollers being pressed against the wall of the bore with sufficient force to prevent axial movement of the rollers, said rollers being prevented from falling radially inwardly into the center of the bore solely by the keystoning effect of said circumferentially spaced portions.

2. A roller assembly in accordance with claim 1 wherein: each of said three portions are compressible, flexible spring portions.

3. A roller assembly in accordance with claim 1 wherein: the roller retention mechanism has two end rims and at least three equally circumferentially spaced, axially extending, interconnecting springs, each spring being radially outwardly curved with the curved portion extending into contact with the converging arcs of two adjoining roller surfaces.

4. A roller assembly in accordance with claim 1 wherein: the roller retention mechanism is a spring formed so as to have at least three circumferentially separated, axially extending portions, each axially extending portion located to wedge against two adjoining roller surfaces.

* * * * *